(12) United States Patent
Panferov et al.

(10) Patent No.: US 9,378,061 B2
(45) Date of Patent: Jun. 28, 2016

(54) METHOD FOR PRIORITIZING TASKS QUEUED AT A SERVER SYSTEM (71) Applicant: ABBYY Development LLC, Moscow (RU)

(72) Inventors: Vasily Vladimirovich Panferov, Moscow Region (RU); Dmitry Konstantinovich Mesheryakov, Moscow (RU)

(73) Assignee: ABBYY Development LLC (RU)

( * ) Notice: Subject to any disclaimer, the term of this patent is extended or adjusted under 35 U.S.C. 154(b) by 0 days.

(21) Appl. No.: 14/571,832

(22) Filed: Dec. 16, 2014

(65) Prior Publication Data

US 2015/0370606 A1  Dec. 24, 2015

(51) Int. Cl.
*G06F 9/46* (2006.01)
*G06F 9/50* (2006.01)
*H04L 12/911* (2013.01)
*G06F 9/48* (2006.01)

(52) U.S. Cl.
CPC ............ *G06F 9/5038* (2013.01); *G06F 9/4881* (2013.01); *H04L 47/821* (2013.01)

(58) Field of Classification Search
IPC .................. G06F 9/5083,9/4881; G06Q 10/00, G06Q 10/0631; H04W 4/02; H04L 67/322
See application file for complete search history.

(56) References Cited

U.S. PATENT DOCUMENTS

| 8,695,005 | B2 | 4/2014 | Bowers et al. | |
|---|---|---|---|---|
| 2002/0073129 | A1* | 6/2002 | Wang | G06F 9/4881 718/102 |
| 2005/0055694 | A1* | 3/2005 | Lee | G06F 9/5083 718/100 |
| 2007/0287473 | A1* | 12/2007 | Dupray | H04W 4/02 455/456.1 |
| 2011/0173038 | A1 | 7/2011 | Moon et al. | |
| 2012/0192197 | A1 | 7/2012 | Doyle et al. | |
| 2012/0239451 | A1* | 9/2012 | Caligor | G06Q 10/00 705/7.21 |

* cited by examiner

*Primary Examiner* — Tuan Vu
(74) *Attorney, Agent, or Firm* — LeighAnn Weiland; Veronica Weinstein (57) ABSTRACT

An algorithm for assigning priorities to tasks queued for processing by users based on how heavily each task's user used the system resources in the past, including the number of tasks queued by the user in the past, the volume of these tasks, and the amount of processor time used. In the OCR context, the tasks are graphic files placed on servers and chosen for processing in accordance with the assigned priorities.

15 Claims, 5 Drawing Sheets

METHOD FOR PRIORITIZING TASKS QUEUED AT A SERVER SYSTEM

FIELD OF THE INVENTION

This application claims the benefit of priority to Russian Patent Application No. 2014125148, filed Jun. 23, 2014; disclosure of which is incorporated herein by reference in its entirety.

The present invention relates to prioritizing tasks in a queue performed by a local or a cloud-based server system.

BACKGROUND OF THE INVENTION

In a variety of situations, when several queued tasks have to be performed on one or several computers or processors for several users, it is necessary for a given available processor to decide which of the available pending tasks to perform first. Systems processing large numbers of tasks queued by users may experience issues related to load buffering. When a task takes a long time to process users may queue work items faster than they can be processed.

One approach is to put new tasks into a queue upon arrival to be processed in the first-in-first-out (FIFO) manner by the processor. This principle is straightforward one user. However, for multiple users queuing tasks at random times, when all users expect reasonably fast processing, this approach might be unsatisfactory.

For example, suppose every task takes 10 seconds to be processed. A user A comes first and quickly puts one hundred tasks into the queue so that it will take 17 minutes to process all of them. One minute after user A had put his tasks into the queue, a user B queues a single task. If the system follows the FIFO rule, the single task from user B would not be processed until all tasks of user A are processed about 16 minutes later. User B has to wait about 16 minutes to just have a single task processed in 10 seconds.

Another common approach is to assign to each task a number so that the processor can choose a task with a highest priority.

When several users provide tasks for the processors, care must be taken to prioritize tasks in accordance with users' expectations, for example, by dividing processor time and other resources equitably between the users. The equitability in this context may imply equitable sharing of processor time, of how frequently tasks are provided by the users, and how large the user's tasks are. The new tasks of a user who recently used more processor time, posted more tasks and more cumulative task volume should have comparatively smaller priority than a new task from a less demanding user.

One example of such tasks is optical character recognition (OCR) processing of images (in any graphic format, such as pdf, tiff, jpeg, etc.) containing text. In this case the size or volume of each task is measured in pages. The processing time of a task is not necessarily directly related to the number of pages in the task, at least because of the amount of text on different pages within different tasks may vary.

SUMMARY OF THE INVENTION

The tasks may reside on a cloud server system, on a remote or local network server, or on the same computer that is responsible for processing the tasks (this computer then functions as the server) as long as the users are able to upload the tasks onto the system. Each computer or processor, upon completing one task, requests the task with the highest priority available from the server. The processor then beings processing the task and, while doing it, does not process any other task, or interrupts for processing any other task.

According to the present invention, each task queued in the system is assigned a priority selected from the priority range, for example, from 0 to 255, with number 0 being the highest priority that can be assigned to a task. Different tasks belonging to the same user may be assigned different priorities depending on the usage patterns. Normally, the priority of a task remains unchanged for the lifetime of the task.

Upon a new task's arrival the system looks at how intensively the user was submitting new items in the nearest past and assigns the new task a priority so that the tasks from users who infrequently queue small number of tasks get better priority, and tasks from users who intensively submit large numbers of tasks get worse priorities. The system further deviates from the FIFO approach in that the tasks are first selected by priority—tasks with higher priority are handled first—and the tasks with the same priority are ordered by their arrival time.

In the OCR context the tasks are typically image files or PDF files that can contain more than one page. The system uses the number of pages in addition to the number of tasks to analyze the usage pattern because the time needed to process a task is often approximately proportional to the number of pages in the task and so the priority of the future tasks of the same user should be affected by the number of pages, not only by the number of tasks queued by the user.

In order to characterize used processor time used, number of tasks, and task volume (e.g. number of pages to be OCRed) a variety of monotonic metrics may be used. Monotonic metrics are functions (with arguments, such as time or number of pages or tasks) that depend on their arguments monotonically, i.e., entirely non-increasing or entirely non-decreasing on its entire relevant domain. Monotonic dependency is a dependency that is expressed by a monotonic function.

Embodiments of this invention include methods for prioritizing for at least one processor a plurality of tasks of a plurality of users, comprising, for an unprocessed task provided by a user from the plurality of users, assigning a numerical priority to the user; calculating a monotonic metric M1 for cumulative processor time used by prior tasks provided by the user on the at least one processor within a prior time period T1; calculating a monotonic metric M2 for time interval between the unprocessed task and a preceding task provided by the user for the at least one processor within a prior time period T2; calculating a monotonic metric M3 for cumulative task volume provided by the user for the at least one processor within a prior time period T3; reducing the user's numerical priority monotonically depending on M1, M2, and M3; and assigning the user's numerical priority to the unprocessed task; wherein unprocessed tasks with higher priorities are selected for processing on the at least one processor before unprocessed tasks with lower priorities; and wherein the at least one processor sequentially executes only one task at a time Embodiments of this invention also include system comprising a computer server or a cloud server storing tasks and storing software capable of executing instructions for prioritizing for at least one processor a plurality of tasks of a plurality of users, comprising, for an unprocessed task provided by a user from the plurality of users, assigning a numerical priority to the user; calculating a monotonic metric M1 for cumulative processor time used by prior tasks provided by the user on the at least one processor within a prior time period T1; calculating a monotonic metric M2 for time interval between the unprocessed task and a preceding task provided by the user for the at least one processor within a prior time period T2; calculating a monotonic metric M3 for cumulative task volume provided by the user for the at least one processor within a prior time period T3; reducing the user's numerical priority monotonically depending on M1, M2, and M3; and assigning the user's numerical priority to the unprocessed task; wherein unprocessed tasks with higher priorities are selected for processing on the at least one processor before unprocessed tasks with lower priorities; and wherein the at least one processor sequentially executes only one task at a time.

Embodiments of this invention also include a physical, non-transitory computer storage medium having stored thereon a program which when executed by a processor, performs instructions for prioritizing for at least one processor a plurality of tasks of a plurality of users, comprising, for an unprocessed task provided by a user from the plurality of users, assigning a numerical priority to the user; calculating a monotonic metric M1 for cumulative processor time used by prior tasks provided by the user on the at least one processor within a prior time period T1; calculating a monotonic metric M2 for time interval between the unprocessed task and a preceding task provided by the user for the at least one processor within a prior time period T2; calculating a monotonic metric M3 for cumulative task volume provided by the user for the at least one processor within a prior time period T3; reducing the user's numerical priority monotonically depending on M1, M2, and M3; and assigning the user's numerical priority to the unprocessed task; wherein unprocessed tasks with higher priorities are selected for processing on the at least one processor before unprocessed tasks with lower priorities; and wherein the at least one processor sequentially executes only one task at a time.

Embodiments of the present invention may also include calculating a monotonic metric M4 for cumulative task volume provided by the user for the at least one processor within an earlier time period T4; and reducing the user's numerical priority monotonically depending on M1, M2, M3, and M4.

In embodiments of the present invention, at least one processor may execute any of the plurality of tasks entirely without interrupting for any other task of the plurality of tasks or simultaneously processing any other task of the plurality of tasks.

In embodiments of the present invention, the user's numerical priority may be an integer within an interval.

In embodiments of the present invention, among unprocessed tasks with equal priorities the task provided for processing at an earlier moment may be selected for processing on the at least one processor before other unprocessed tasks with equal priorities.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE INVENTION

The system stores five variables for each user: user priority (not to be confused with a task's priority), number of pages last hour, number of pages last minute, last hour end, and last minute end. The latter two variables are stored so that the system is not required to constantly update all the data every time a user posts a task.

Each new task is characterized by the number of pages in the task (or, more generally, the task's size or volume), by the user, who placed the task in the queue, by whether the task is ready for processing, and by priority of the task (which is initially undefined). They are stored with the task in the task's local memory as variables in addition to other variables needed for the algorithm.

The purpose of the algorithm described below is to assign a priority to the task. In this embodiment, the priority is an integer number between 0 and 255.

Figure 1:
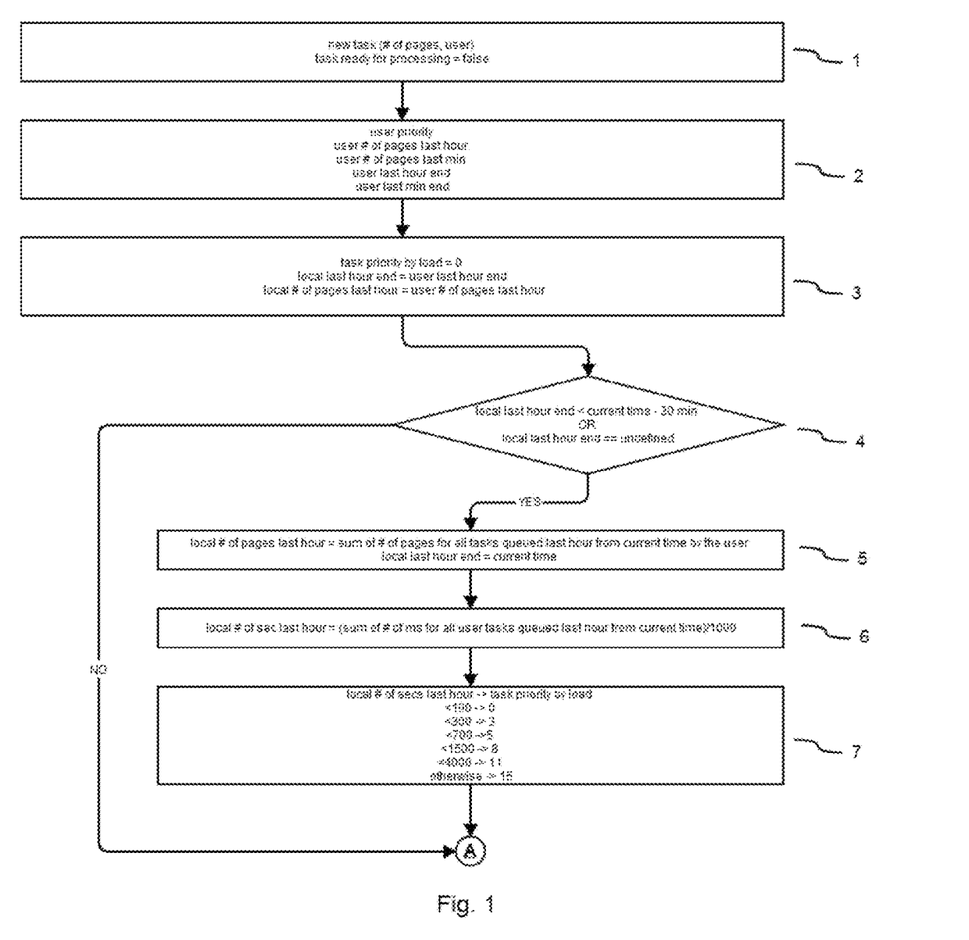
FIG. 1 is a flow chart of first several steps in one particular embodiment of the invention. Element A shows how the flowchart of FIG. 1 connects to the flowchart of FIG. 2.

As shown in FIG. 1, when the task is placed on a server, the task is ready for processing variable is set to false (flowchart element 1). Then the variables associated with the user are fetched (flowchart element 2).

The task priority by load in local memory is set to zero. The user last hour end time is copied into the local memory as the local last hour end, and the user number of pages last hour is copied into the local memory as the local number of pages last hour (flowchart element 3).

Figure 2:
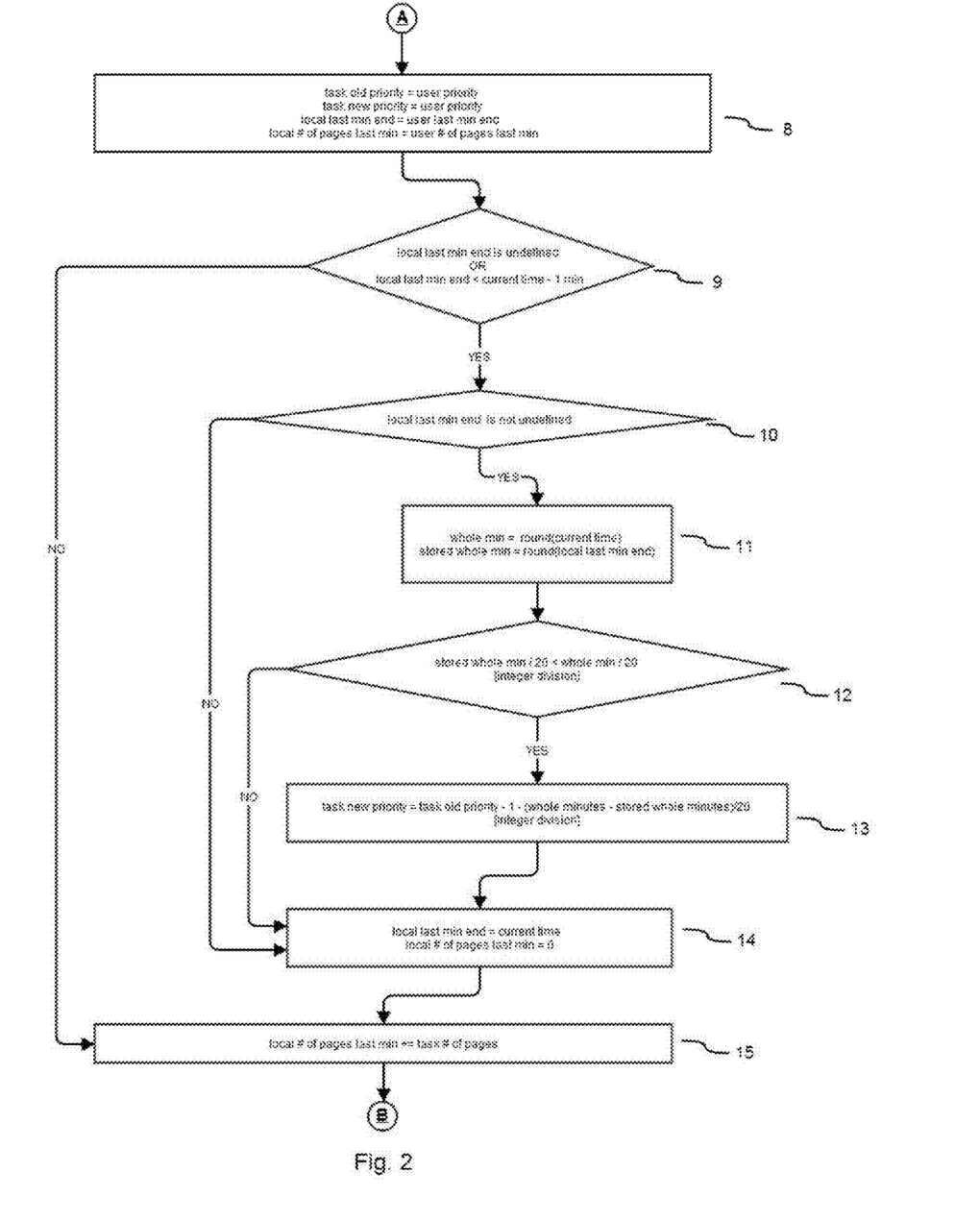
FIG. 2 is a flow chart of several steps in the particular embodiment of the invention subsequent to the steps shown in FIG. 1. Element B shows how the flowchart of FIG. 2 connects to the flowchart of FIG. 3.

If (flowchart element 4) the local last hour end time is undefined (i.e. has no value) or less than 30 minutes before the current time (otherwise, the next steps are shown in FIG. 2):

The system scans the tasks queued by the user within an hour before the current time and sets the local number of pages last hour to the total number of pages in all these tasks (sum of numbers of pages over the tasks queued by the user over the last hour). The local last hour end is set to current time (flowchart element 5).

The system scans the tasks queued by the user and sets the local number of seconds last hour to the total number of milliseconds each task took to process over the last hour divided by one thousand (flowchart element 6).

The local number of seconds last hour obtained in the previous step is used to compute the task priority by load according to the following rule which approximates logarithmic function (flowchart element 7):

if the local number of seconds last hour is less than 100, the task priority by load is 0, otherwise if the local number of seconds last hour is less than 300, the task priority by load is 3, otherwise if the local number of seconds last hour is less than 700, the task priority by load is 5, otherwise if the local number of seconds last hour is less than 1500, the task priority by load is 8, otherwise if the local number of seconds last hour is less than 4000, the task priority by load is 11, otherwise the task priority by load is 15.

The task priority by load and the local number of pages last hour being obtained, the subsequent steps are shown in FIG. 2.

The user priority is copied into the task old priority. The task new priority is set to the task old priority. The user last minute end time is copied into the local last minute end, and the user number of pages last minute is copied into the local number of pages last minute (flowchart element 8).

If (flowchart element 9) the local last minute end time is undefined (i.e. has no value) or is smaller than one minute ago (otherwise, skip the next three paragraphs):

If (flowchart element 10) the local when the last minute end is not undefined (has value), the whole minutes variable is set to the current time rounded to the whole number of minutes, and the stored whole minutes variable is set to the local last minute rounded to the whole number of minutes (flowchart element 11). Otherwise, skip the next paragraph.

If (flowchart element 12) the stored whole minutes variable integer divided by 20 is smaller than the whole minutes variable integer divided by 20 (so that this step is executed at most once per 20 minutes), the task new priority is set to the task local old priority minus one minus (the whole minutes minus the stored whole minutes) integer divided by 20 (flowchart element 13).

The local last minute end is set to current time. The local number of pages last minute is set to zero (flowchart element 14).

The local number of pages last minute is increased by the number of pages in the new task (flowchart element 15).

Figure 3:
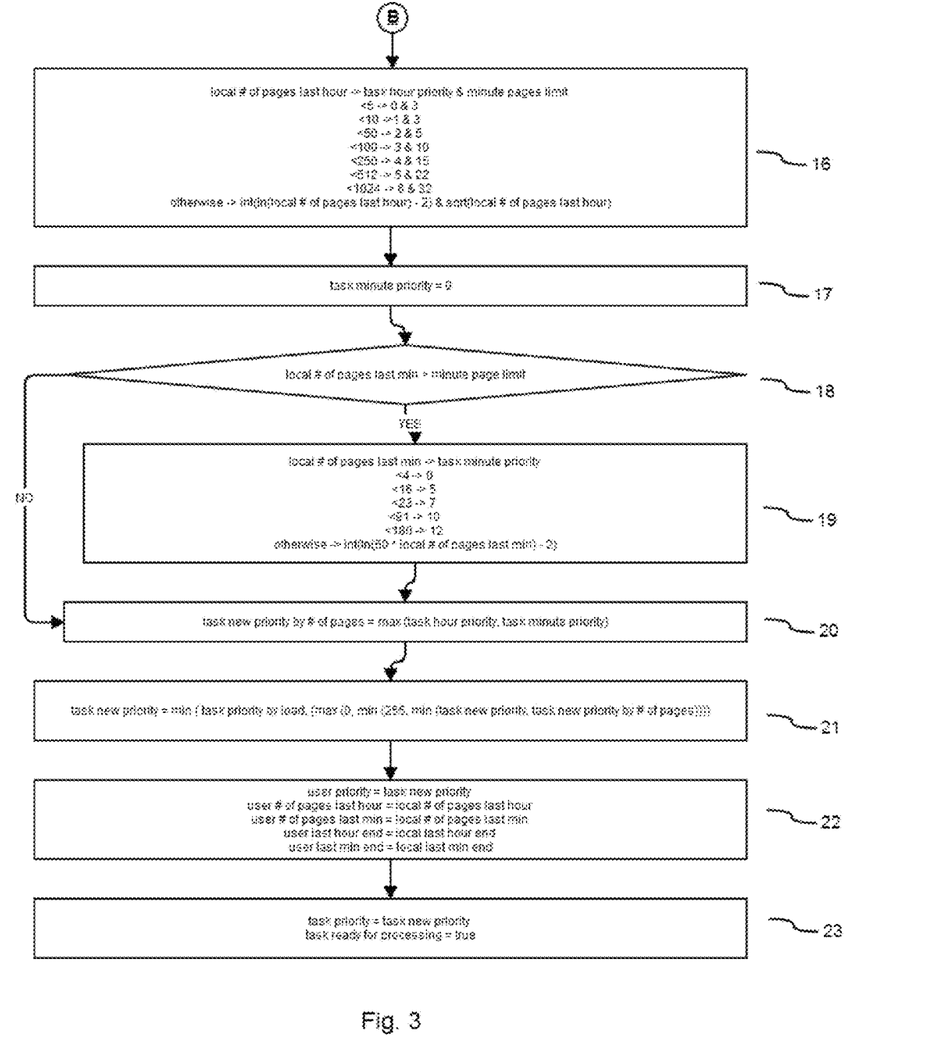
FIG. 3 is a flow chart of final several steps in the particular embodiment of the invention subsequent to the steps shown in FIG. 2.

The local number of pages last minute being obtained, the subsequent steps are shown in FIG. 3.

If the local number of pages last hour is less than 5, the task hour priority is set to 0 and the minute pages limit is set to 3, otherwise if the local number of pages last hour is less than 10, the task hour priority is set to 1 and the minute pages limit is set to 3, otherwise if the local number of pages last hour is less than 50, the task hour priority is set to 2 and the minute pages limit is set to 5, otherwise if the local number of pages last hour is less than 100, the task hour priority is set to 3 and the minute pages limit is set to 10, otherwise if the local number of pages last hour is less than 250, the task hour priority is set to 4 and the minute pages limit is set to 15, otherwise if the local number of pages last hour is less than 512, the task hour priority is set to 5 and the minute pages limit is set to 22, otherwise if the local number of pages last hour is less than 1024, the task hour priority is set to 6 and the minute pages limit is set to 32, otherwise, the task hour priority is set to the integer part of the natural logarithm of the local number of pages last hour less 2, and the minute pages limit is set to the integer part of the square root of the local number of pages last hour (flowchart element 16).

The task minute priority is set to zero (flowchart element 17).

If (flowchart element 18) the local number of pages last minute is greater than the minute pages limit:

if the local number of pages last minute is less than 4, the task minute priority is set to 0, otherwise if the local number of pages last minute is less than 16, the task minute priority is set to 5, otherwise if the local number of pages last minute is less than 23, the task minute priority is set to 7, otherwise if the local number of pages last minute is less than 91, the task minute priority is set to 10, otherwise if the local number of pages last minute is less than 180, the task minute priority is set to 12, otherwise, the task minute priority is set to the integer part of the natural logarithm of (the local number of pages last minute multiplied by 60) less 2 (flowchart element 19).

The task new priority by number of pages is set to the greater of the task hour priority and the task minute priority (flowchart element 20).

The task new priority is set to the lesser of the task new priority by number of pages and the task new priority. If the task new priority is larger than 255, the task new priority is set to 255; if the task new priority is less than zero then the task new priority is set to zero (flowchart element 21).

The task new priority is set to the lesser of the task priority by load and the task new priority (flowchart element 21).

The user last hour end is set to the local last hour end. The user last minute end is set to the local last minute end. The user number of pages last hour is set to the local number of pages last hour. The user number of pages last minute is set to the local number of pages last minute. The user priority is set to the task new priority (flowchart element 22).

The priority of the new task is set to the task new priority; the task is ready for processing variable is set to true (flowchart element 23).

Now the new task on the server is ready to be fetched by the processor when appropriate according to the new task's priority set as described hereinabove.

Figure 4:
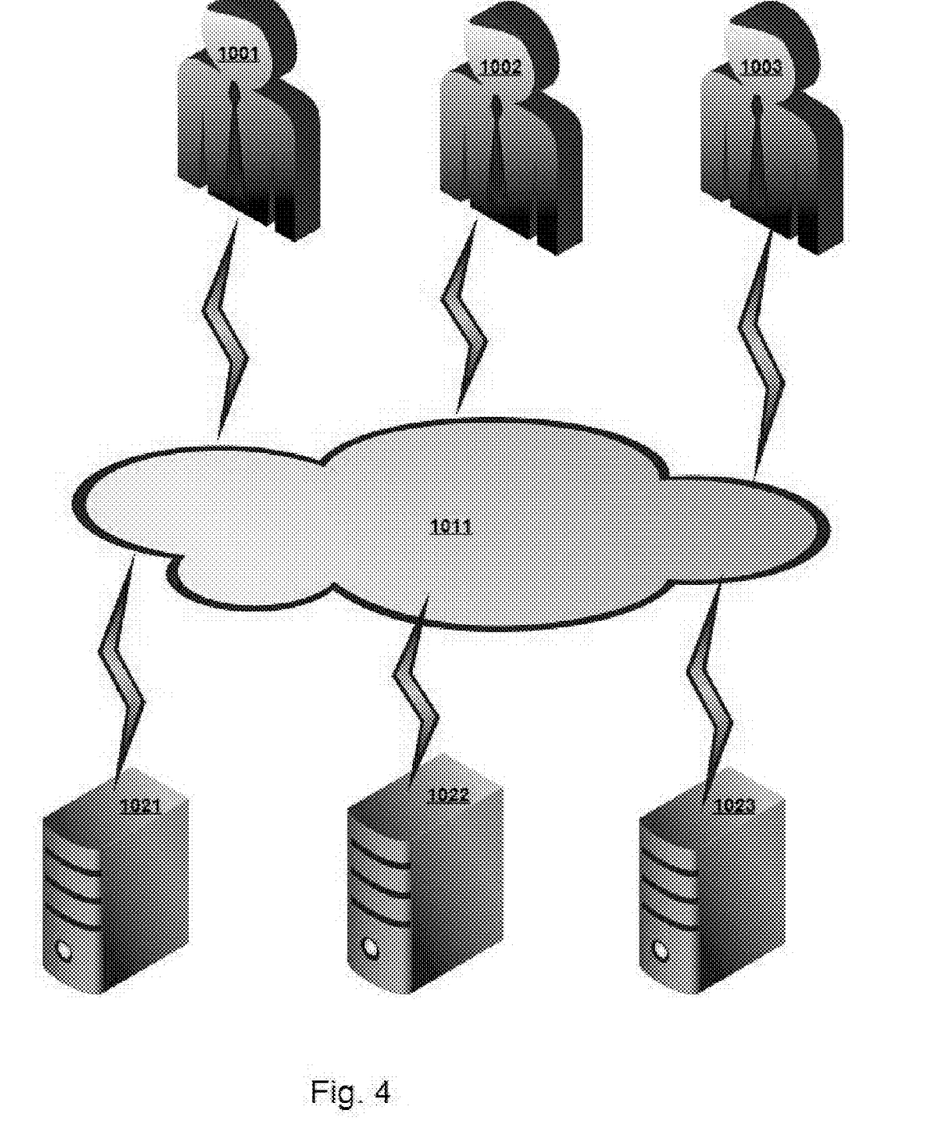
FIG. 4 is a schematic illustration of a system implementing the present invention for several users and several processors using a cloud server.

FIG. 4 shows a system implementing, for several users and several processors, using a cloud server, a method for prioritizing tasks comprising, for an unprocessed task provided by a user assigning a numerical priority to the user; calculating a monotonic metric M1 for cumulative processor time used by prior tasks provided by the user on the at least one processor within a prior time period T1; calculating a monotonic metric M2 for time interval between the unprocessed task and a preceding task provided by the user for the at least one processor within a prior time period T2; calculating a monotonic metric M3 for cumulative task volume provided by the user for the at least one processor within a prior time period T3; reducing the user's numerical priority monotonically depending on M1, M2, and M3; and assigning the user's numerical priority to the unprocessed task; wherein unprocessed tasks with higher priorities are selected for processing on the at least one processor before unprocessed tasks with lower priorities; and wherein the at least one processor sequentially executes only one task at a time. Users 1001, 1002, and 1003, upload tasks (for example, OCR tasks) onto the cloud server 1011, where a priority is set for each task in accordance with a method embodying this invention. The tasks fetched from the cloud server and processed (for example, by OCR processing) by the processors 1021, 1022, and 1023. The users and processors connect with the cloud server via Internet, another network, wirelessly, or directly.

Figure 5:
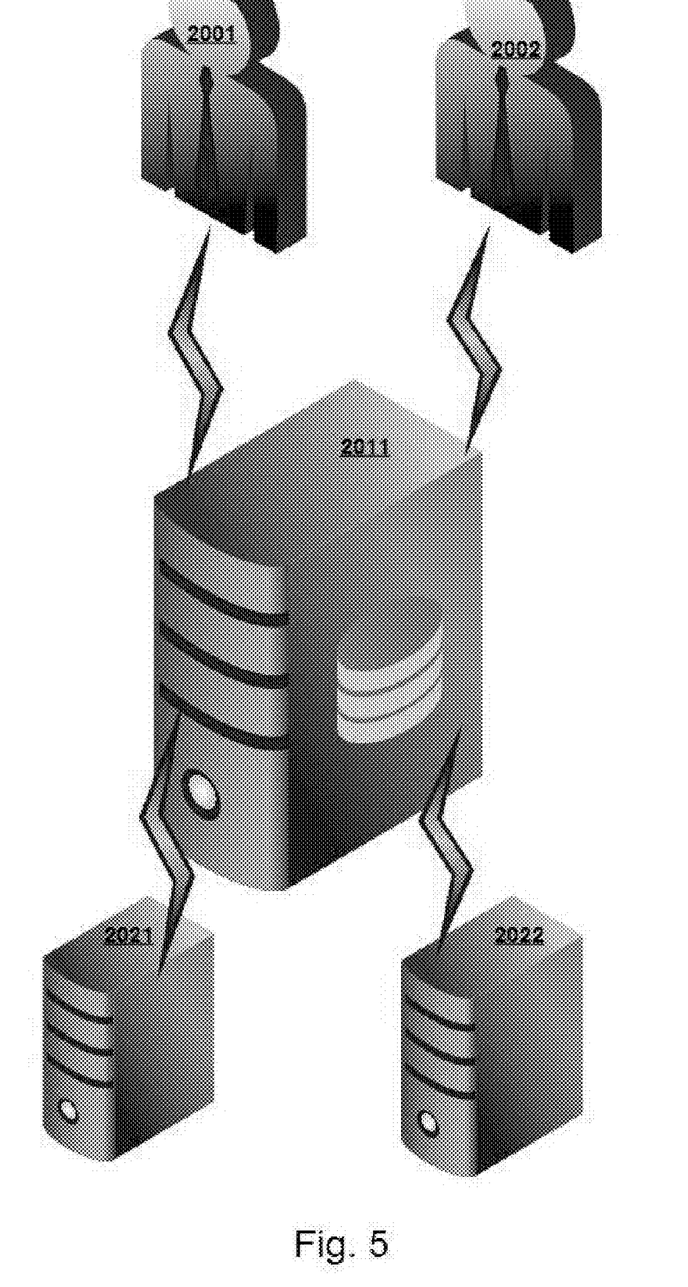
FIG. 5 is a schematic illustration of a system implementing the present invention for several users and several processors using a computer server.

FIG. 5 shows a system implementing for several users and several processors using a computer server, a method for prioritizing tasks comprising, for an unprocessed task provided by a user assigning a numerical priority to the user; calculating a monotonic metric M1 for cumulative processor time used by prior tasks provided by the user on the at least one processor within a prior time period T1; calculating a monotonic metric M2 for time interval between the unprocessed task and a preceding task provided by the user for the at least one processor within a prior time period T2; calculating a monotonic metric M3 for cumulative task volume provided by the user for the at least one processor within a prior time period T3; reducing the user's numerical priority monotonically depending on M1, M2, and M3; and assigning the user's numerical priority to the unprocessed task; wherein unprocessed tasks with higher priorities are selected for processing on the at least one processor before unprocessed tasks with lower priorities; and wherein the at least one processor sequentially executes only one task at a time. Users 2001 and 2002, upload tasks (for example, OCR tasks) onto the computer server 2011, where a priority is set for each task in accordance with a method embodying this invention. The tasks fetched from the computer server and processed (for example, by OCR processing) by the processors 2021 and 2022. The users and processors connect with the computer server via Internet, another network wirelessly, or directly.

While this invention has been particularly shown and described with references to preferred embodiments thereof, it will be understood by those skilled in the art that various changes in form and details may be made therein without departing from the scope of the invention encompassed by the appended claims.

What is clamed is:

1. A method for prioritizing for at least one processor a plurality of tasks of a plurality of users, comprising, for an unprocessed task provided by a user from the plurality of users,
    assigning a numerical priority to the user;
    calculating a monotonic metric M1 for cumulative processor time used by prior tasks provided by the user on the at least one processor within a prior time period T1;
    calculating a monotonic metric M2 for time interval between the unprocessed task and a preceding task provided by the user for the at least one processor within a prior time period T2;
    calculating a monotonic metric M3 for cumulative task volume provided by the user for the at least one processor within a prior time period T3;
    reducing the user's numerical priority monotonically depending on M1, M2, and M3; and
    assigning the user's numerical priority to the unprocessed task;
    wherein unprocessed tasks with higher priorities are selected for processing on the at least one processor before unprocessed tasks with lower priorities; and
    wherein the at least one processor sequentially executes only one task at a time.

2. The method of claim 1, further comprising:
    calculating a monotonic metric M4 for cumulative task volume provided by the user for the at least one processor within an earlier time period T4; and
    reducing the user's numerical priority monotonically depending on M1, M2, M3, and M4.

3. The method of claim 1, wherein the at least one processor executes any of the plurality of tasks entirely without interrupting for any other task of the plurality of tasks or simultaneously processing any other task of the plurality of tasks.

4. The method of claim 1, wherein the user's numerical priority is an integer within an interval.

5. The method of claim 1, wherein among unprocessed tasks with equal priorities the task provided for processing at an earlier moment is selected for processing on the at least one processor before other unprocessed tasks with equal priorities.

6. A system comprising: a computer server or a cloud server being equipped with physical memory for storing tasks and software capable of executing instructions for prioritizing for at least one processor a plurality of tasks of a plurality of users, comprising, for an unprocessed task provided by a user.
    calculating a monotonic metric M1 for cumulative processor time used by prior tasks provided by the user on the at least one processor within a prior time period T1;
    calculating a monotonic metric M2 for time interval between the unprocessed task and a preceding task provided by the user for the at least one processor within a prior time period T2;
    calculating a monotonic metric M3 for cumulative task volume provided by the user for the at least one processor within a prior time period T3;
    reducing the user's numerical priority monotonically depending on M1, M2, and M3; and
    assigning the user's numerical priority to the unprocessed task;
    wherein unprocessed tasks with higher priorities are selected for processing on the at least one processor before unprocessed tasks with lower priorities; and
    wherein the at least one processor sequentially executes only one task at a time.

7. The system of claim 6, wherein the instructions further comprise:
    calculating a monotonic metric M4 for cumulative task volume provided by the user for the at least one processor within an earlier time period T4; and
    reducing the user's numerical priority monotonically depending on M1, M2, M3, and M4.

8. The system of claim 6, wherein the at least one processor executes any of the plurality of tasks entirely without interrupting for any other task of the plurality of tasks or simultaneously processing any other task of the plurality of tasks.

9. The system of claim 6, wherein the user's numerical priority is an integer within an interval.

10. The system of claim 6, wherein among unprocessed tasks with equal priorities the task provided for processing at an earlier moment is selected for processing on the at least one processor before other unprocessed tasks with equal priorities.

11. A physical, non-transitory computer storage medium having stored thereon a program which when executed by a processor, performs instructions for prioritizing for at least one processor a plurality of tasks of a plurality of users, comprising, for an unprocessed task provided by a user from the plurality of users,
    assigning a numerical priority to the user;
    calculating a monotonic metric M1 for cumulative processor time used by prior tasks provided by the user on the at least one processor within a prior time period T1;
    calculating a monotonic metric M2 for time interval between the unprocessed task and a preceding task provided by the user for the at least one processor within a prior time period T2;
    calculating a monotonic metric M3 for cumulative task volume provided by the user for the at least one processor within a prior time period T3;
    reducing the user's numerical priority monotonically depending on M1, M2, and M3; and
    assigning the user's numerical priority to the unprocessed task;

wherein unprocessed tasks with higher priorities are selected for processing on the at least one processor before unprocessed tasks with lower priorities; and wherein the at least one processor sequentially executes only one task at a time.

12. The medium of claim 11, wherein the instructions further comprise:

calculating a monotonic metric M4 for cumulative task volume provided by the user for the at least one processor within an earlier time period T4; and reducing the user's numerical priority monotonically depending on M1, M2, M3, and M4.

13. The medium of claim 11, wherein the at least one processor executes any of the plurality of tasks entirely without interrupting for any other task of the plurality of tasks or simultaneously processing any other task of the plurality of tasks.

14. The medium of claim 11, wherein the user's numerical priority is an integer within an interval.

15. The medium of claim 11, wherein among unprocessed tasks with equal priorities the task provided for processing at an earlier moment is selected for processing on the at least one processor before other unprocessed tasks with equal priorities.

* * * * *